(12) United States Patent
Tanaka

(10) Patent No.: US 7,893,752 B2
(45) Date of Patent: Feb. 22, 2011

(54) CHARGE PUMP CIRCUIT WITH CONTROL CIRCUITRY

(75) Inventor: Shunsei Tanaka, Toyonaka (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 12/137,815

(22) Filed: Jun. 12, 2008

(65) Prior Publication Data

US 2009/0002064 A1 Jan. 1, 2009

(30) Foreign Application Priority Data

Jun. 29, 2007 (JP) ............................. 2007-172311

(51) Int. Cl.
*G05F 1/10* (2006.01)
*G05F 3/02* (2006.01)

(52) U.S. Cl. ...................... 327/537; 327/534; 327/536; 363/60

(58) Field of Classification Search ................. 327/148, 327/157, 534–537; 363/59, 60
See application file for complete search history.

(56) References Cited

U.S. PATENT DOCUMENTS

| | | | |
|---|---|---|---|
| 4,800,339 A * | 1/1989 | Tanimoto et al. ............ | 330/253 |
| 5,227,865 A * | 7/1993 | Moriizumi et al. ............ | 327/51 |
| 6,392,904 B1 * | 5/2002 | Bayer et al. .................... | 363/59 |
| 6,400,211 B1 * | 6/2002 | Yokomizo et al. ........... | 327/536 |
| 2005/0083090 A1 * | 4/2005 | Moraveji ..................... | 327/157 |
| 2005/0104651 A1 * | 5/2005 | Hashimoto .................. | 327/536 |
| 2005/0231127 A1 * | 10/2005 | Yamamoto et al. .......... | 315/224 |
| 2005/0285665 A1 * | 12/2005 | Donaldson et al. .......... | 327/530 |
| 2007/0127277 A1 * | 6/2007 | Fujiwara ...................... | 363/59 |
| 2007/0176671 A1 * | 8/2007 | Ishida ......................... | 327/536 |

FOREIGN PATENT DOCUMENTS

JP 2003-259624 9/2003

\* cited by examiner

*Primary Examiner*—Lincoln Donovan
*Assistant Examiner*—Brandon S Cole
(74) *Attorney, Agent, or Firm*—Dickstein Shapiro LLP

(57) ABSTRACT

A reversal charge pump circuit generates a negative voltage from an input voltage received from an input terminal, and provides an output terminal with the negative voltage. The charge pump circuit achieves increased voltage stability and avoids breakdown voltage problems, with an uncomplicated structure. The circuit may have first and second capacitors, first through fourth switches, and a voltage control circuit. The voltage control circuit controls the voltage provided to the first capacitor. The switches are on/off controlled by signals from a control circuit.

11 Claims, 4 Drawing Sheets

CHARGE PUMP CIRCUIT WITH CONTROL CIRCUITRY

BACKGROUND OF INVENTION

The present invention relates to a charge pump circuit for generating a negative voltage. The present invention also relates to a circuit for generating a negative voltage that can be provided to a substrate gate of a MOS transistor in a monolithic IC.

Recently there are many devices in, for example, cellular phones, that need a negative voltage. For example, there is a device in which a substrate gate (back gate) of a MOS transistor receives a negative voltage to restrict a leak current that would otherwise be generated by miniaturization. For example, where a Li-ion battery is used as a positive voltage power source, a circuit is needed to generate a negative voltage from the positive voltage.

FIG. 4 is a circuit diagram illustrating a conventional reversal charge pump circuit for generating a negative voltage. In FIG. 4, a charge pump circuit 100 includes a control circuit 105, switches SW101, SW102, SW103, SW104, configured as MOS transistors, and driver circuits 101, 102, 103, 104 that correspond to the switches. The control circuit 105 operates the switches SW101-SW104 through the driver circuits 101-104.

At first, the control circuit 105 turns on the switches SW101, SW102 and turns off the switches SW103, SW104. At the time, a capacitor C101 is charged with a voltage value that is Vin−Vc. Subsequently, the control circuit 105 turns off the switches SW101, SW102 and turns on the switches SW103, SW104. Thus, a capacitor C102 is charged with a negative voltage that has the voltage value of the capacitor C101, but reversed in polarity. As a result, the negative voltage is provided as an output voltage Vout. The output voltage Vout becomes −(Vin−Vc) when there is no load.

A voltage value of a connection CN becomes a negative voltage −(Vin−Vc). A voltage value between the gates of the switches SW102, SW104 and the connection CN becomes maximum 2×(Vin−Vc), when a power source voltage of the switches SW102, SW104 is the input voltage Vin. As a result, the voltage value may exceed a breakdown voltage of the MOS transistors. To prevent the voltage value from exceeding the breakdown voltage of the MOS transistors, it may be necessary to provide a complex voltage control or an output voltage of a constant voltage circuit such as the input voltage Vin. Thus, there are problems with the prior art which may require an increase in man-hours of circuit design or an increase in the size of the circuit.

Furthermore, a voltage range of the input voltage Vin includes 3.2 V–4.4 V, when the input power source uses a Li-ion battery. The voltage of the connection CN includes −4.4V–−3.2V, when a common voltage is 0V. As a result, the output voltage Vout has a large ripple and becomes unstable. Thus, a different voltage between the positive voltage and the negative voltage of the charge pump circuit 100 becomes twice the input voltage Vin and more than the breakdown voltage of the MOS transistors, when the common voltage Vc includes 0V. Therefore, the size of a chip may need to be increased, when the breakdown voltage is raised by a manufacturing process. It may be difficult and time consuming to design the circuit when a voltage control circuit is required to avoid exceeding the breakdown voltage. In addition, the constant voltage circuit needs to change design by a current that is provided from an output terminal, when the charge pump circuit receives the input voltage Vin from the constant voltage circuit. As a result, the size of the chip and the man-hours of circuit design increase.

Japanese Patent Laid-Open No. 2003-259624 shows a power source providing circuit to prevent a problem when the power source providing circuit provides a positive voltage and a negative voltage to a load formed of GaAs FET or MMIC. The prior art power source providing circuit is different than the present invention.

SUMMARY OF INVENTION

The present invention is directed to a charge pump circuit that satisfies or addresses one or more of the aforementioned deficiencies. The present invention is also directed to a charge pump circuit that can reduce the ripple of an output voltage ripple with an uncomplicated construction, without raising a breakdown voltage of a switch. The present invention is also directed to a charge pump circuit that is reverse type and can operate at less than a breakdown voltage of a switch.

To achieve the above object, a charge pump circuit is provided which generates a predetermined negative voltage from an input voltage received from an input terminal, and which supplies the predetermined negative voltage as an output voltage at an output terminal. According to one aspect of the invention, the charge pump circuit includes a first capacitor having first and second terminals, and a second capacitor connected between the output terminal and a reference voltage. A first switch is configured to turn on/off according to a control signal. The first switch is connected to the input terminal. The charge pump circuit also may have a circuit for controlling a voltage provided to the first capacitor. The voltage control circuit is preferably connected to the first switch and to the first capacitor. Further, a second switch is configured to turn on/off according to the control signal. The second switch is connected between the first capacitor and the reference voltage. In the preferred embodiment, first and second connections are connected between the first capacitor and the voltage control circuit, and between the first capacitor and the second switch, respectively. Third and fourth switches are configured to turn on/off according to the control signal. The third switch is connected between the first connection and the reference voltage, and the fourth switch is connected between the second connection and the output terminal. In operation, the voltage control circuit provides a current that flows through the first switch to the first capacitor, and controls the voltage of the first connection such that the voltage of the first connection is lower than a predetermined voltage.

According to another aspect of the invention, the voltage control circuit includes a constant voltage circuit, and a field effect transistor that has a control electrode that receives a constant voltage from the constant voltage circuit. The field effect transistor is connected between the second terminal of the first switch and the first connection.

According to yet another aspect of the invention, each of the four switches includes a field effect transistor, and the control circuit part includes four corresponding driver circuits, that drive the respective switches. If desired, a control circuit is used to operate the switches, via the driver circuits.

In operation, the control circuit performs a first operation of turning on the first switch and the second switch and turning off the third switch and the fourth switch, and a second operation of turning off the first switch and the second switch and turning on the third switch and the fourth switch after the first operation, and repeats the operations alternately in synchronism with a clock signal.

According to a preferred embodiment of the invention, a voltage monitoring circuit detects the output voltage of the output terminal and intercepts the clock signal to the control circuit when the output voltage is less than a predetermined voltage value, and the control circuit turns on the first switch and the second switch and turns off the third switch and the fourth switch when the clock signal is intercepted.

According to another aspect of the invention, the voltage monitoring circuit provides a binary signal that indicates whether the output voltage is less than the predetermined voltage value or not, and a clock signal output control circuit provides the clock signal to the control circuit according to the signal of the voltage monitoring circuit.

In describing preferred embodiments illustrated in the drawings, specific terminology is employed for purposes of clarity. However, the disclosure of this patent specification is not intended to be limited to the specific terminology so used and it is to be understood that substitutions for each specific element can include any technical equivalents that operate in a similar manner.

DETAILED DESCRIPTION OF PREFERRED EMBODIMENTS

Figure 1:
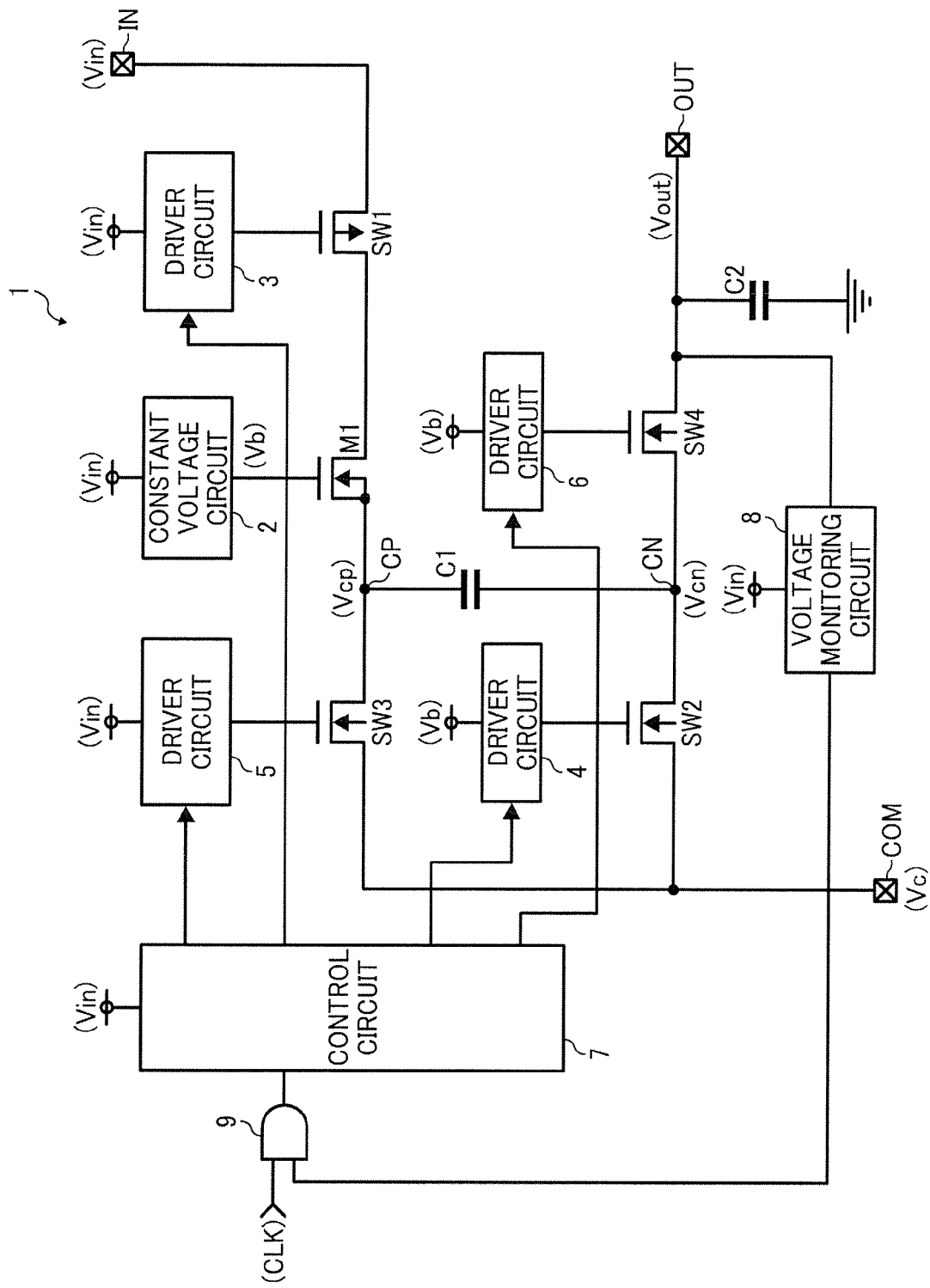
FIG. 1 is a circuit diagram illustrating a charge pump circuit according to a first embodiment of the present invention.

FIG. 1 is a circuit diagram illustrating a charge pump circuit according to a first embodiment of the present invention. In FIG. 1, a charge pump circuit 1 generates a predetermined negative voltage −V1 from an input voltage Vin that is received at an input terminal IN. The circuit 1 provides the predetermined negative voltage as an output voltage Vout from an output terminal OUT. The charge pump circuit 1 includes switches SW1, SW2, SW3, SW4, a NMOS transistor M1, a constant voltage circuit 2, capacitors C1, C2, driver circuits 3, 4, 5, 6, a control circuit 7, a voltage monitoring circuit 8, and an AND circuit 9. The switch SW1 includes a PMOS transistor. The switches SW2, SW3, SW4 include NMOS transistors. The constant voltage circuit 2 generates and provides a predetermined positive voltage Vb.

The control circuit 7 operates switching of the switches SW1, SW2, SW3, SW4 through the driver circuits 3, 4, 5, 6. The switch SW1 forms a first switch, the switch SW2 forms a second switch, the switch SW3 forms a third switch, and the switch SW4 forms a fourth switch. The constant voltage circuit 2 and NMOS transistor M1 form a voltage control circuit. The driver circuits 3, 4, 5, 6 and the control circuit 7 form a control circuit part. The capacitor C1 forms a first capacitor and the capacitor C2 forms a second capacitor. Furthermore, the NMOS transistor M1 forms a first transistor. The driver circuit 3 forms a first driver circuit, the driver circuit 4 forms a second driver circuit, the driver circuit 5 forms a third driver circuit, and the driver circuit 6 forms a fourth driver circuit. In addition, the voltage monitoring circuit 8 and the AND circuit 9 form a voltage monitoring circuit part. The AND circuit 9 forms a clock signal output control circuit.

The switch SW1, the NMOS transistor M1, and the switch SW3 are serially connected between the input terminal IN and a common terminal COM that receives a common voltage Vc. The switches SW2, SW4 are serially connected between the common terminal COM and the output terminal OUT. A connection CP is connected to the NMOS transistor M1 and the switch SW3. A connection CN is connected to the switches SW2, SW4. The capacitor C1 is connected between the connection CP and the connection CN. The capacitor C2 is connected between the output terminal OUT and a ground voltage. A gate of the NMOS transistor M1 receives a constant voltage Vb from the constant voltage circuit 2.

Gates of the switches SW1, SW2, SW3, SW4 are connected to the corresponding driver circuits 3, 4, 5, 6. The driver circuits 3, 4, 5, 6 are each connected to the control circuit 7. The gates of the switches SW1, SW2, SW3, SW4 and the switching operation of the switches SW1, SW2, SW3, SW4 are based on control signals that are provided from the control 7. The voltage monitoring circuit 8 monitors a voltage value of the output voltage Vout. The voltage monitoring circuit 8 provides a signal that indicates a result of the monitoring to one input terminal of the AND circuit. Another input terminal of the AND circuit 9 receives a predetermined clock signal CLK. An output terminal of the AND circuit 9 is connected to the control circuit 7. The input voltage Vin is applied to power sources for the driver circuits 3, 5, the control circuit 7, and the voltage monitoring circuit 8. The constant voltage Vb is supplied to the power sources for the driver circuits 4, 6.

The control circuit 7 operates to turn on/off the switches SW1, SW2, SW3, SW4 based on and in synchronism with the clock signal CLK. At first, the control circuit 7 turns on the switches SW1, SW2, so that each switch SW1, SW2 is in a conducting state, and turns off the switches SW3, SW4, so that each switch SW3, SW4 is in a non-conducting state. The voltage Vcp of the connection CP is required to be less than the constant voltage Vb applied to the gate of the NMOS transistor M1. That is, when the voltage Vcp of the connection CP exceeds the constant voltage Vb, the NMOS transistor M1 turns off. Therefore, the voltage Vcp becomes less than the constant voltage Vb. The capacitor is charged with the voltage of (Vcp−Vc).

Further, the control circuit 7 turns off the switches SW1, SW2, so that each switch SW1, SW2 is in a non-conducting state, and turns on the switches SW3, SW4, such that each switch SW3, SW4 is an a conducting state. Thus, the voltage Vcn of the connection CN becomes −(Vcp−Vc). The capacitor C2 is charged with a reversal voltage, that is, the charged voltage of the capacitor Cl, but reversed in polarity. The negative voltage is provided as the voltage Vout from the output terminal OUT.

The voltage monitoring circuit 8 monitors the output voltage Vout. The voltage monitoring circuit 8 provides a low level signal to the AND circuit 9 when the output voltage Vout becomes less than a voltage −V1. When the AND circuit 9 receives the low level signal, the AND circuit 9 stops providing the clock signal CLK and provides a low level signal. In this case, the control circuit 7 turns on the switches SW1, SW2 and turns off the switches SW3, SW4.

When the output voltage Vout is more than the voltage −V, the voltage monitoring circuit 8 provides a high level signal to the AND circuit 9, such that the AND circuit 9 provides the clock signal CLK. In this case, the control circuit 7 operates to turn on/off the switches SW1, SW2, SW3, SW4 based on and in synchronism with the clock signal CLK. The voltage monitoring circuit 8 monitors a negative voltage −V that includes the output voltage Vout so that the above process is repeated. As the driver circuits 4, 5, 6 are operated by the constant voltage Vb, the driver circuits provide a high level signal that includes the voltage Vb with the gates of the switches SW2, SW4 when the corresponding switches SW2, SW4 turn on.

Therefore, the voltage Vcn of the connection CN includes the voltage Vc when the switches SW1, SW2 turn on. In this case, the maximum voltage received by switch SW2 is (Vb−Vc). In contrast, when the switches SW3, SW4 turn on, the voltage Vcn of the connection CN becomes −(Vcp−Vc). When the voltage Vcn becomes minimum, the voltage Vcn is −(Vb−Vc). In other words, as the switch SW4 receives a voltage value that includes maximum voltage 2×(Vb−Vc), the voltage Vb is set so that the voltage 2×(Vb−Vc) becomes less than a breakdown voltage of the switch SW4. In addition, a minimum condition of the voltage Vb exceeds an absolute value of the voltage V1 and becomes less than the input voltage Vin.

The output voltage Vout becomes −(Vb−Vc), and the voltage Vb is less than the input voltage Vin. Thus, the amount of rippling of the output voltage is reduced in comparison with the prior art when the input voltage includes an input voltage of a Li-ion battery.

Figure 2:
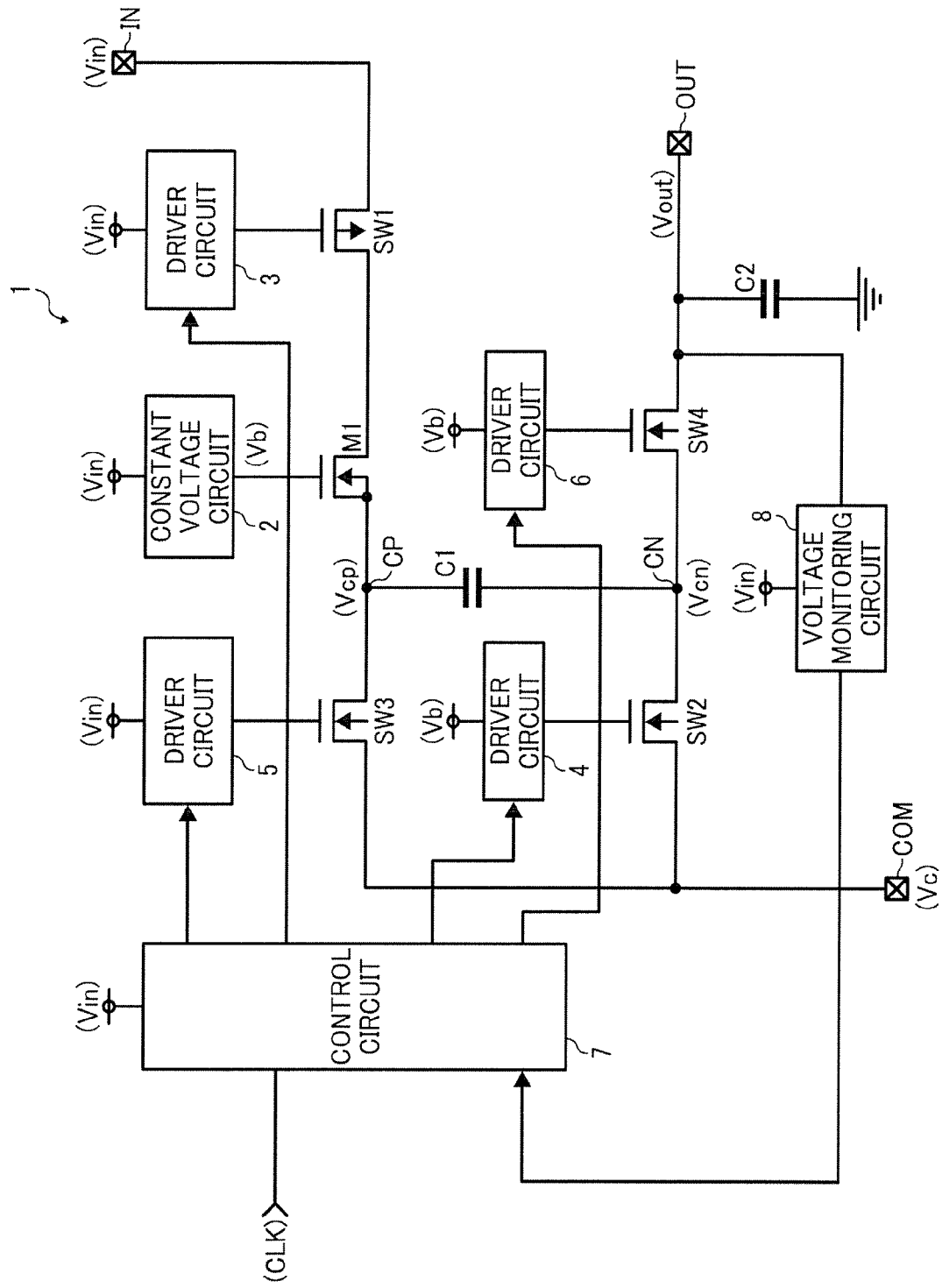
FIG. 2 is a circuit diagram illustrating a charge pump circuit according to another embodiment of the present invention.

In FIG. 1, the clock signal CLK is intercepted to provide for the control circuit 7 corresponding with the output signal of the voltage monitoring circuit 8. On the other hand, the output signal of the voltage monitoring circuit 8 and the clock signal CLK may be provided to the control circuit 7 directly. The control circuit 7 operates to turn on/off the switches SW1, SW2, SW3, SW4 in synchronism with a signal that a frequency of the clock signal CLK received is dropped, when the control circuit 7 receives a signal indicating that the output voltage Vout is less than the voltage −V1. In this case, the circuit shown in FIG. 2 may be used instead of the one shown in FIG. 1, and the voltage monitoring circuit 8 forms a voltage monitoring circuit part.

Figure 3:
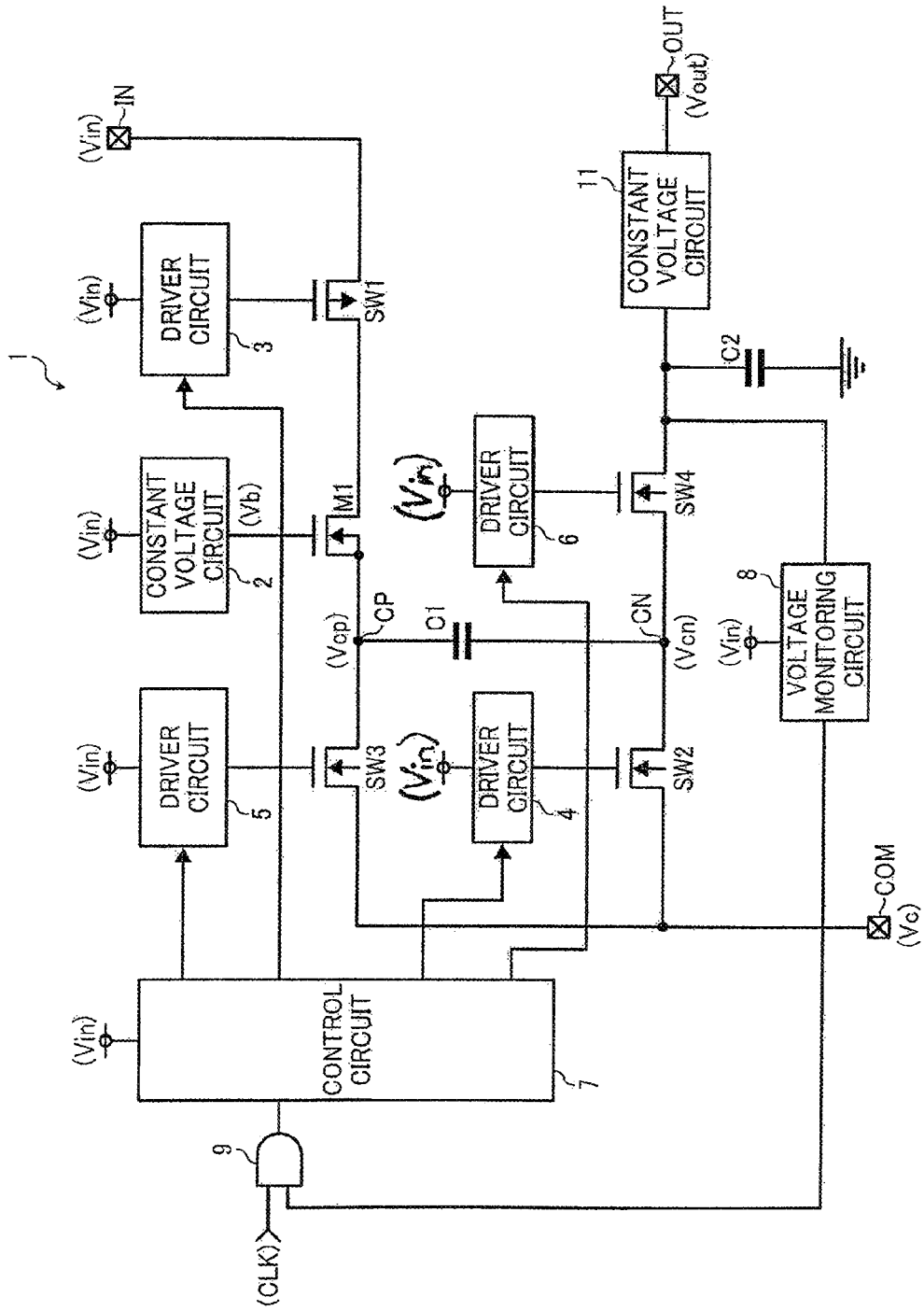
FIG. 3 is a circuit diagram illustrating a charge pump circuit according to yet another embodiment of the present invention.
Figure 4:
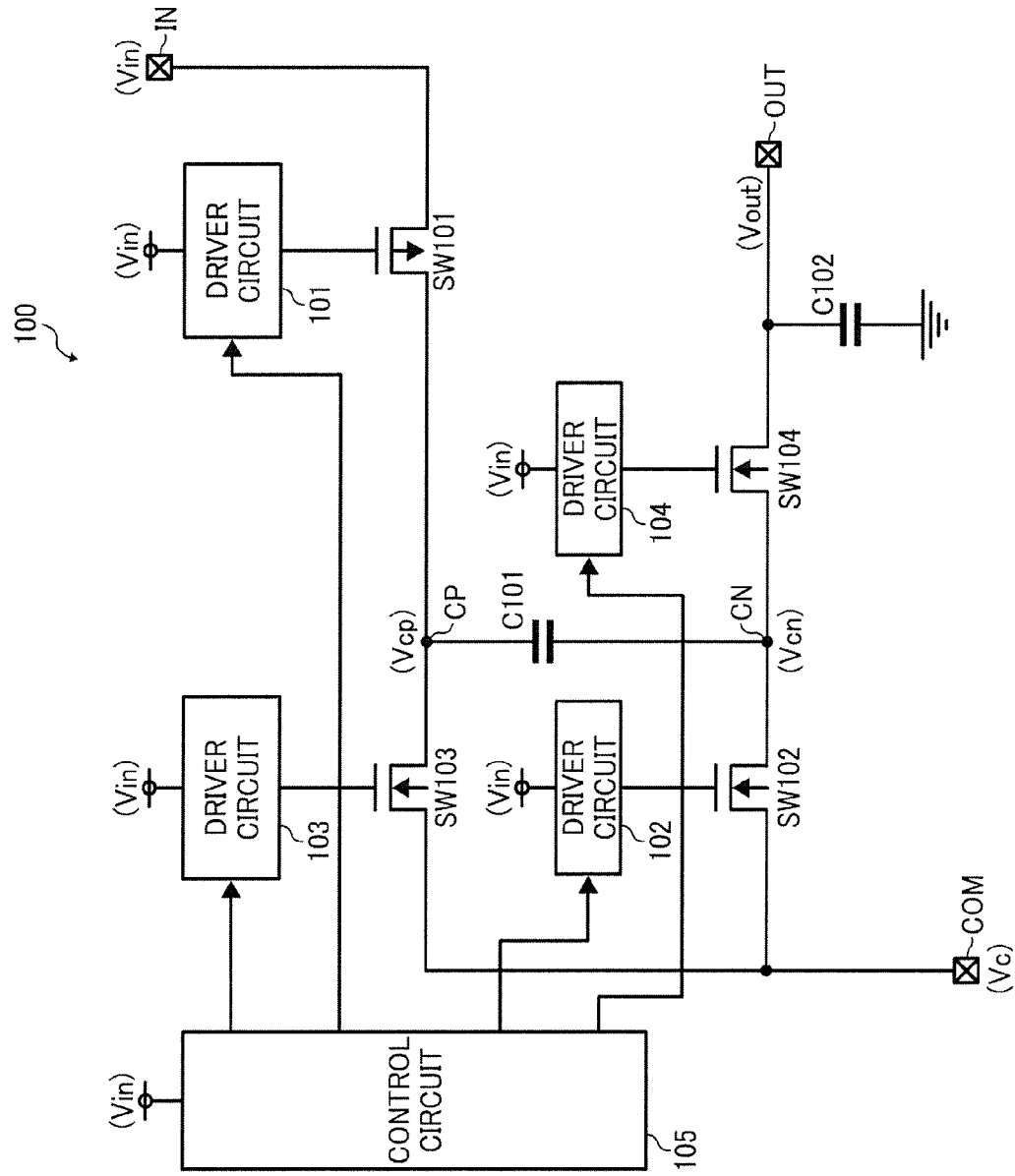
FIG. 4 is a circuit diagram illustrating a charge pump circuit according to the conventional art.

By way of further example, the present invention can be applied as shown in FIG. 3. A constant voltage circuit 11 is connected between the switch SW4 and the capacitor C2 and the output terminal OUT, and regulates the output voltage to a constant voltage. The power sources for the driver circuits 4, 6 may supply the constant voltage Vb to the driver circuits 4, 6. In another embodiment, as shown in FIG. 3, the driver circuits 4, 6 receive the input voltage Vin as the power source. In this case, the switch SW4 receives maximum voltage (Vin+Vb−Vc) when the switch SW4 turns on. Thus, when the driver circuits 4, 6 are operated with the constant voltage Vb as the power source, the maximum voltage can be smaller than 2×(Vin−Vc).

The charge pump circuit of the present invention includes the NMOS transistor that is connected between the switch SW1 and the connection CP and the constant voltage Vb connects the gate thereof. Thus, the charge pump circuit of the present invention can reduce rippling of the output voltage and can prevent breakdown of the MOS transistor, so that the circuit can be constructed simply without increasing the breakdown voltage of the MOS transistors.

The entire disclosure of Japanese Application JP 2007-172311, filed Jun. 29, 2007, is incorporated herein by reference.

The above description and drawings are only to be considered illustrative of exemplary embodiments, which achieve features and advantages of the present invention. Modification and substitutions to specific conditions and structures can be made without departing from the spirit and scope of the present invention. Accordingly, the invention is not to be limited by the foregoing description and drawings, but is only limited by the scope of the appended claims.

What is claimed is:

1. A charge pump circuit for generating a predetermined negative voltage from an input voltage received from an input terminal, and for providing an output terminal with the predetermined negative voltage as an output voltage, the charge pump circuit comprising:
a first capacitor having first and second terminals;
a second capacitor connected between the output terminal and a reference voltage;
a first switch configured to turn on/off according to a control signal, the first switch having first and second terminals, the first terminal being connected to the input terminal;
a voltage control circuit configured to control a voltage provided to the first capacitor, the voltage control circuit being connected to the second terminal of the first switch and to the first terminal of the first capacitor, the voltage control circuit comprising:
a constant voltage circuit; and
a field effect transistor that has a control electrode that receives a constant voltage from the constant voltage circuit, wherein the field effect transistor is connected between the second terminal of the first switch and the first connection;
a second switch configured to turn on/off according to the control signal, the second switch being connected between the second terminal of the first capacitor and the reference voltage;
a first connection connected between the first capacitor and the voltage control circuit;
a third switch configured to turn on/off according to the control signal, the third switch being connected between the first connection and the reference voltage;
a second connection connected between the first capacitor and the second switch;
a fourth switch configured to turn on/off according to the control signal, the fourth switch being connected between the second connection and the output terminal; and
a control circuit part configured to control the first switch, the second switch, the third switch, and the fourth switch,
wherein the voltage control circuit provides a current that flows through the first switch to the first capacitor, and controls the voltage of the first connection such that the voltage of the first connection is lower than a predetermined voltage.

2. The charge pump circuit of claim 1, wherein the first switch, the second switch, the third switch, and the fourth switch each includes a field effect transistor, and wherein the control circuit part includes:
a first driver circuit, a second driver circuit, a third driver circuit, and a fourth driver circuit, corresponding to the first switch, the second switch, the third switch, and the fourth switch, respectively, and that drive the first switch, the second switch, the third switch and the forth switch, respectively; and
a control circuit that operates the first switch, the second switch, the third switch, and the fourth switch, by using the first driver circuit, the second driver circuit, the third driver circuit, and the fourth driver circuit.

3. The charge pump circuit of claim 2, wherein the second driver circuit and the fourth driver circuit are operated by the constant voltage.

4. The charge pump circuit of claim 2, wherein the second driver circuit and the fourth driver circuit are operated by the input voltage.

5. The charge pump circuit of claim 2, wherein the first switch includes a PMOS transistor, and wherein the second switch, the third switch, and the fourth switch each include an NMOS transistor.

6. The charge pump circuit of claim 2, wherein the control circuit performs a first operation of turning on the first switch and the second switch and turning off the third switch and the fourth switch, and a second operation of turning off the first switch and the second switch and turning on the third switch and the fourth switch after the first operation, and repeats the operations alternately in synchronism with a received clock signal.

7. The charge pump circuit of claim 2, wherein a voltage monitoring circuit detects the output voltage of the output terminal and intercepts the clock signal to the control circuit when the output voltage is less than a predetermined voltage value, and wherein the control circuit turns on the first switch and the second switch and turns off the third switch and the fourth switch when the clock signal is intercepted.

8. The charge pump circuit of claim 2, wherein a voltage monitoring circuit detects the output voltage of the output terminal and provides a signal that indicates whether the output voltage is less than the predetermined voltage value or not, and wherein the control circuit operates the first switch, the second switch, the third switch, and the fourth switch, in synchronism with a clock signal.

9. The charge pump circuit of claim 7, wherein the voltage monitoring circuit provides a binary signal that indicates whether the output voltage is less than the predetermined voltage value or not, and wherein a clock signal output control circuit provides the clock signal to the control circuit according to the signal of the voltage monitoring circuit.

10. The charge pump circuit of claim 1, wherein the field effect transistor includes a NMOS transistor.

11. The charge pump circuit of claim 1, further comprising a second constant voltage circuit located between the fourth switch and the output terminal.

* * * * *